(12) United States Patent
Nakahara

(10) Patent No.: US 7,565,074 B2
(45) Date of Patent: Jul. 21, 2009

(54) CAMERA HAVING A FOCUS ADJUSTING SYSTEM

(75) Inventor: Naoto Nakahara, Saitama (JP)

(73) Assignee: Hoya Corporation, Tokyo (JP)

(*) Notice: Subject to any disclaimer, the term of this patent is extended or adjusted under 35 U.S.C. 154(b) by 266 days.

(21) Appl. No.: 11/754,506

(22) Filed: May 29, 2007

(65) Prior Publication Data
US 2007/0285556 A1 Dec. 13, 2007

(30) Foreign Application Priority Data
May 31, 2006 (JP) ............... 2006-151161

(51) Int. Cl.
G03B 13/00 (2006.01)
G03B 3/00 (2006.01)
(52) U.S. Cl. ..................... 396/125
(58) Field of Classification Search ............... 396/125, 396/103, 104, 89
See application file for complete search history.

(56) References Cited

U.S. PATENT DOCUMENTS

| | | | |
|---|---|---|---|
| 6,549,729 B1* | 4/2003 | Robins et al. | 396/103 |
| 6,847,402 B2* | 1/2005 | Sugimoto et al. | 348/354 |
| 7,058,294 B2 | 6/2006 | Nakahara | |
| 2005/0041136 A1* | 2/2005 | Miyata et al. | 348/345 |
| 2005/0104992 A1* | 5/2005 | Aoyama et al. | 348/345 |
| 2006/0028579 A1* | 2/2006 | Sato | 348/362 |
| 2006/0067677 A1* | 3/2006 | Tokiwa et al. | 396/502 |

FOREIGN PATENT DOCUMENTS

| | | |
|---|---|---|
| JP | 2000-258681 | 9/2000 |
| JP | 2002-72074 | 3/2002 |

OTHER PUBLICATIONS

English language Abstract of JP 2000-258681.
English language Abstract of JP 2002-72074.
U.S. Appl. No. 11/609,518 to Nakamura, which was filed on Dec. 12, 2006.

* cited by examiner

Primary Examiner—W. B. Perkey
Assistant Examiner—Noam Reisner
(74) Attorney, Agent, or Firm—Greenblum & Bernstein, P.L.C.

(57) ABSTRACT

A camera includes a focus adjusting system; first and second switches for a focus adjusting system and an exposure device; and a controller. If the second switch is operated before the focusing lens group reaches a specified focal length position, the search operation stops and the exposure device activates after the focus adjusting system performs the search operation until an infinite focus position. If the second switch is operated after the focusing lens group reaches the specified focal length position, the search operation immediately stops and the exposure device activates. If the in-focus position is detected by the search operation after completion thereof, the focusing lens group moves to the in-focus position and the exposure device activates. If no in-focus position is detected by the search operation after completion thereof, the focusing lens group moves to the specified focal length position and the exposure device activates.

9 Claims, 6 Drawing Sheets $$a_n = G+R+B+G$$

$$\sum_{n=0}^{max}(a_{n+2}-a_n)^2$$

CAMERA HAVING A FOCUS ADJUSTING SYSTEM

BACKGROUND OF THE INVENTION

1. Field of the Invention

The present invention relates to a focus adjusting system, more specifically to a camera having a focus adjusting system which detects an in-focus state while moving a focusing lens group.

2. Description of the Prior Art

Conventional contrast detection (contrast measurement) focus adjusting systems detect a focus state while moving a focusing lens group from the near extremity to the far extremity thereof, or vice versa. Namely, conventional contrast detection focus adjusting systems detect an in-focus position where a peak contrast is obtained by performing a search operation in which the focusing lens group is moved along an optical axis from one of the infinite focus position (far extremity/position for bringing an object at infinity into focus) and the closest (shortest) focus position (near extremity/position for bringing an object at the shortest distance in working range into focus) to the other. A digital camera having this type of focus adjusting system drives the focusing lens group to the in-focus position, and thereupon enters a ready-to-photograph state after having performed the aforementioned search operation from the closest focus position to the infinite focus position upon the release button being depressed by half a step (refer to Japanese Laid-Open Patent Publication (Kokai) 2000-258681).

It is sometimes the case that the photographer fully depresses the release button of a camera followed by a half-step depression of the release button because the photographer does not want to risk missing even the slightest chance of a photographic opportunity. However, in conventional digital cameras, even if the release button is fully depressed in a single stroke, the shutter is not released until the focusing lens group is moved to an in-focus position after completion of the search operation from the closest focus position to the infinite focus position.

SUMMARY OF THE INVENTION

The present invention provides a camera having a focus adjusting system which can reduce the time lag between a full-step depression of the release button and an image capture by shortening the time for the aforementioned search operation upon the release button being fully depressed during the search operation.

According to an aspect of the present invention, a camera is provided having an exposure device for photographing an object image formed via a photographing optical system, the camera including a focus adjusting system which performs a search operation for detecting an in-focus position while moving a focusing lens group; a first switch which causes activation of the focus adjusting system; a second switch which causes activation of the exposure device; and a controller which controls operations of the exposure device. Upon the second switch being operated before completion of the search operation after the focus adjusting system starts to operate, the controller terminates the search operation and activates the exposure device after the focus adjusting system performs the search operation up to a specified focal length position in the case where the second switch is operated before the focusing lens group reaches the specified focal length position. Upon the second switch being operated before completion of the search operation after the focus adjusting system starts to operate, the controller immediately terminates the search operation and activates the exposure device in the case where the second switch is operated after the focusing lens group reaches the specified focal length position. In the case where the in-focus position is detected by the search operation after completion of the search operation, the focusing lens group is moved to the in-focus position and thereupon the controller activates the exposure device. In the case where no in-focus position is detected by the search operation after completion of the search operation, the focusing lens group is moved to the specified focal length position and thereupon the controller activates the exposure device.

It is desirable for the exposure device to include an imaging device which converts the object image into electrical image data and outputs the electrical image data, and for the focus adjusting system to input the image data and detect the in-focus position based on the image data while moving the focusing lens group from a closest focus position toward an infinite focus position.

It is desirable for the focus adjusting system to include a contrast detection focus adjusting system which detects the in-focus position by detecting contrast values from the image data.

It is desirable for the specified focal length position to correspond to a hyperfocal distance of the photographing optical system.

It is desirable for the hyperfocal distance to be set based on a brightness value of the object image and a focal length of the photographing optical system.

It is desirable for the first switch and the second switch to be associated with a release button provided on a camera body of the camera, and for the first switch and the second switch to be turned ON upon the release button being half and fully depressed, respectively.

It is desirable for the focus adjusting system to include a stepping motor which moves the focusing lens group stepwise from the closest focus position toward the infinite focus position.

It is desirable for the camera to include an imaging device which captures an object image via the photographing optical system and converts the captured object image into an electrical image signal, wherein, while moving the focusing lens group stepwise by the stepping motor, the autofocus system captures an object image each time the focusing lens group is moved by one step, and detects a peak contrast among a plurality of contrasts of the electrical image signals of the captured object images to determine the in-focus position.

In an embodiment, a camera is provided, having an exposure device for photographing an object image formed via a photographing optical system, the camera including a focus adjusting system which performs a search operation for detecting an in-focus position while moving a focusing lens group; a first switch which causes activation of the focus adjusting system; a second switch which causes activation of the exposure device; and a controller which controls operations of the exposure device. Upon the second switch being operated before completion of the search operation after the focus adjusting system starts to operate, the controller terminates the search operation and activates the exposure device after the focus adjusting system performs the search operation up to a specified focal length position in the case where the second switch is operated before the focusing lens group reaches the specified focal length position. Upon the second switch being operated before completion of the search operation after the focus adjusting system starts to operate, the controller immediately terminates the search operation and activates the exposure device in the case where the second switch is operated after the focusing lens group reaches the specified focal length position.

According to the camera having a focus adjusting system to which the present invention is applied, when the second switch is turned ON before completion of the search operation, the time lag between the moment at which the second switch is turned ON and the moment at which an object image is captured is reduced because the search operation is terminated before completion thereof, upon which a focusing process is performed.

Moreover, since the search operation continues to be performed until the focusing lens group reaches the specified focal length position when an object exists on the near side, an object can be brought into focus if this object exists on the near side. Even if no object exists on the near side, an object can be brought into focus if this object exists on the far side.

In the case where the focusing lens group moves beyond the hyperfocal distance position during the search process, an object having been detected up until then can be brought into focus. This object can be brought into focus even if an object exists on the far side.

The present disclosure relates to subject matter contained in Japanese Patent Application No. 2006-151161 (filed on May 31, 2006), which is expressly incorporated herein in its entirety.

BRIEF DESCRIPTION OF THE DRAWINGS

The present invention will be discussed below in detail with reference to the accompanying drawings, in which:

FIGS. 4A and 4B show graphs indicating the relationship between positions of the focusing lens group of the digital camera and the respective contrast values thereat in a contrast AF process performed in the digital camera in the case where an object to be photographed exists on the near side, wherein FIG. 4A shows a state where a search process has been performed from the closest focus position to the infinite focus position and FIG. 4B shows a state where the search process has been performed from the closest focus position to a specified focal length position;

FIGS. 5A and 5B show graphs indicating the relationship between positions of the focusing lens group of the digital camera and the respective contrast values thereat in the contrast AF process performed in the digital camera in the case where an object to be photographed exists on the far side, wherein FIG. 5A shows a state where the search process has been performed from the closest focus position to the infinite focus position and FIG. 5B shows a state where the search process has been performed from the closest focus position to the specified focal length position;

DESCRIPTION OF THE PREFERRED EMBODIMENT

Figure 1:
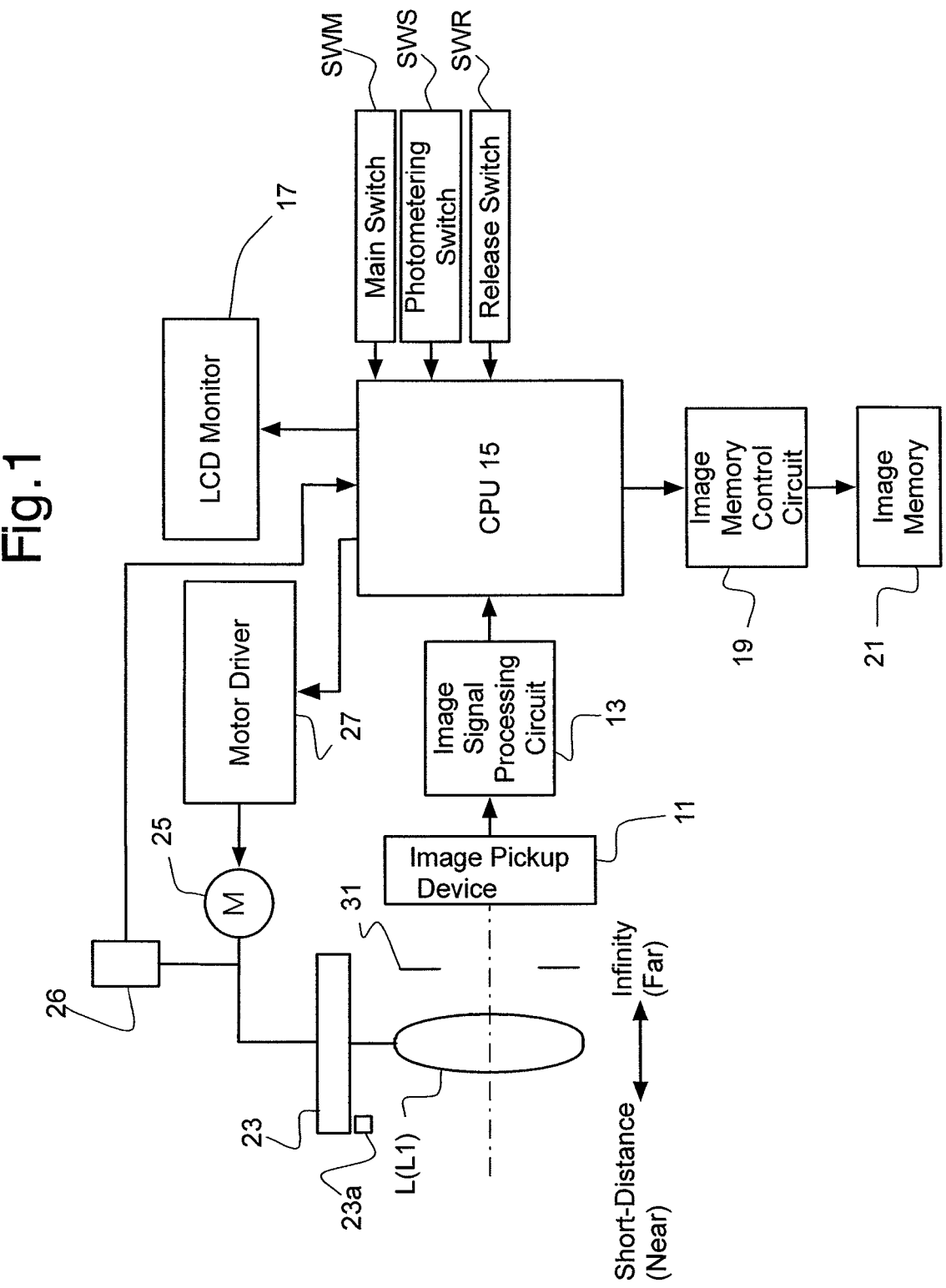
FIG. 1 is a block diagram of elements of an embodiment of a compact digital camera to which the present invention is applied, showing a basic configuration of the digital camera.

FIG. 1 is a block diagram of essential elements of an embodiment of a compact digital camera having a multi-point AF system.

This compact digital camera is provided with a photographing lens L including a focusing lens group (movable lens group) L1, and an image pickup device (CCD image sensor) 11 serving as an imaging device. An object image is formed on a light receiving surface 12 (see FIG. 2) of the image pickup device 11 via the photographing lens L. The focusing lens group L1 is supported to be freely movable within a predetermined range of movement along an optical axis between an infinite focus position (far extremity/position for bringing an object at infinity into focus) and a closest (shortest) focus position (near extremity/position for bringing an object at the shortest distance in working range into focus) and is driven stepwise by an AF motor (stepping motor) 25 via control of a motor driver 27. The motor driver 27 operates via commands from a CPU (controller) 15.

Note that a diaphragm 31 is provided either within the photographing lens L or in between the photographing lens L and the image pickup device 11. The diaphragm 31 is controlled by the CPU 15 so as to be set at an aperture value in accordance with the object brightness, usually via the image pickup device 11.

The image pickup device 11 includes a large number of pixels (photoelectric transducing elements/photo diodes) arranged in a two-dimensional matrix at predetermined intervals. The digital camera is further provided with an image signal processing circuit 13, an LCD monitor 17, an image memory control circuit 19, an image memory 21 and a lens drive mechanism 23. Each pixel of the image pickup device 11 converts the incident light of an object image thereon into an electrical charge, and the electrical charges are accumulated (integrated). Upon completion of an exposure, the accumulated electrical charges are output, pixel by pixel, as an image signal to the image signal processing circuit 13. The image signal processing circuit 13 performs predetermined adjusting processes such as a white-balance adjusting process and an A/D converting process on the input image signal to output digital image data to the CPU 15. The CPU 15 converts the input image data into an image signal capable of being indicated on the LCD monitor 17 to visually indicate the image data on the LCD monitor 17 in a through mode (monitoring mode), and converts the input image data into image data having a predetermined format to write this image data into the image memory 21 via the image memory control circuit 19 upon a release button (not shown) of the digital camera being fully depressed. The CPU 15 determines a shutter speed and an f-number which are considered appropriate for correct exposure based on the image data.

The digital camera includes a contrast AF mode (contrast-detection type AF mode) having a focus-adjusting capability. In the contrast AF mode, a search process for searching (detecting) a peak contrast value is performed. In the search process, an image capturing process for obtaining image data via the image pickup device 11, a detecting operation for detecting a contrast value from the image data, and a storing operation for storing the contrast value are repeated while the focusing lens group L1 is being driven stepwise in the direction from the closest focus position (near extremity) toward the infinite focus position (far extremity) to detect a peak contrast value. Thereupon, an in-focus position of the focusing lens group L1, in which a position of the focusing lens group L1 at which the peak contrast value is obtained, is detected in the contrast AF mode, and the focusing lens group L1 is moved to the in-focus point thus detected.

The position (lens position) of the focusing lens group L1 in the optical axis direction is detected by an origin sensor 23a with the near extremity of the focusing lens group L1 being predetermined as a point of origin, and is counted as the number of drive pulses from the point of origin. The drive pulses are defined as, e.g., pulses output from an encoder 26 such as a photo-interrupter installed on the output shaft of the AF motor 25. Although several hundreds of pulses or more are usually necessary for driving the focusing lens group L1 from the near extremity to the far extremity, it is assumed that several pulses or several dozen pulses are only necessary for driving the focusing lens group L1 (while capturing images) in a stepwise manner from the near extremity to the far extremity in a contrast AF process (see FIG. 7) in the present embodiment of the digital camera for the purpose of simplifying the description. In addition, in the position pulses and drive pulses used in the contrast AF process in the present embodiment of the digital camera, it is assumed that one pulse constitutes more than one drive pulse output from the aforementioned photo-interrupter in the contrast AF process in the present embodiment of the digital camera. In the case where the AF motor 25 is a stepping motor, the number of pulses for driving this stepping motor can be taken as the aforementioned number of the position pulses and drive pulses.

The CPU 15, the lens drive mechanism 23, the origin sensor 23a, AF motor 25, the encoder 26 and the motor driver 27 constitute a focus adjusting system according to the present invention.

The digital camera is further provided with a main switch SWM, a photometering switch (first switch) SWS and a release switch (second switch) SWR. The main switch SWM is for turning ON and OFF the power of the digital camera. The photometering switch SWS and the release switch SWR are associated with the release button (not shown) of the digital camera to be turned ON upon the release button being half and fully depressed, respectively. The CPU 15 checks the ON/OFF states of these switches, and performs a preset process upon detecting such ON/OFF states or changes in ON/OFF states.

Figure 2:
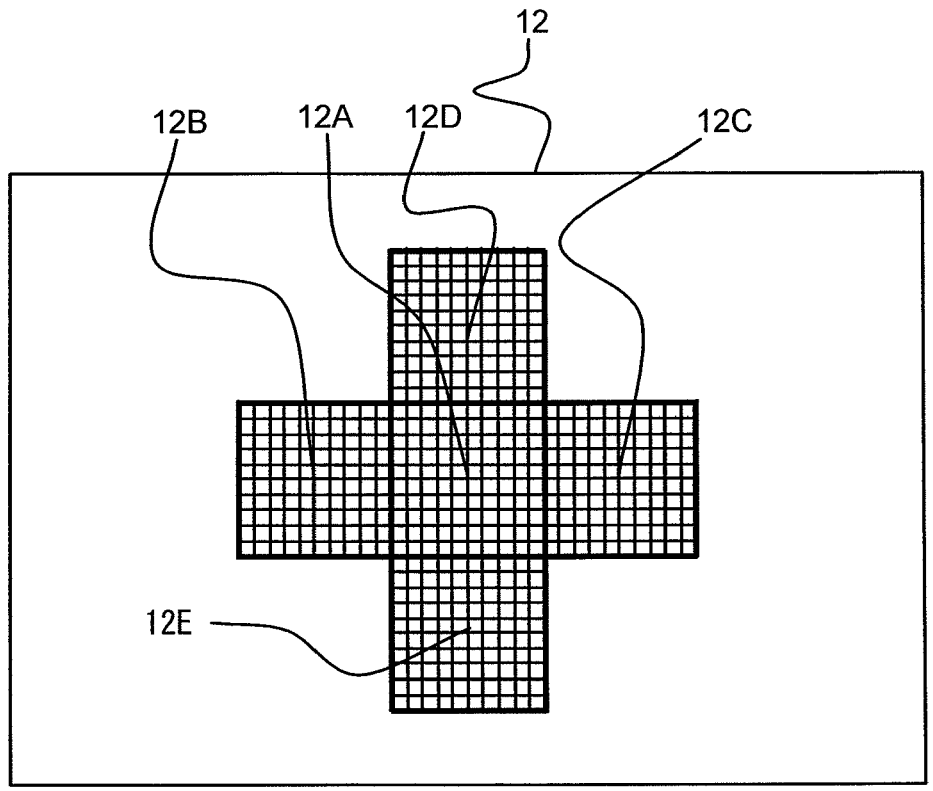
FIG. 2 is a diagrammatic illustration showing the relative position between a light receiving surface of an image pickup device and five focus detection areas on the light receiving surface in the digital camera shown in FIG. 1.
Figure 3:
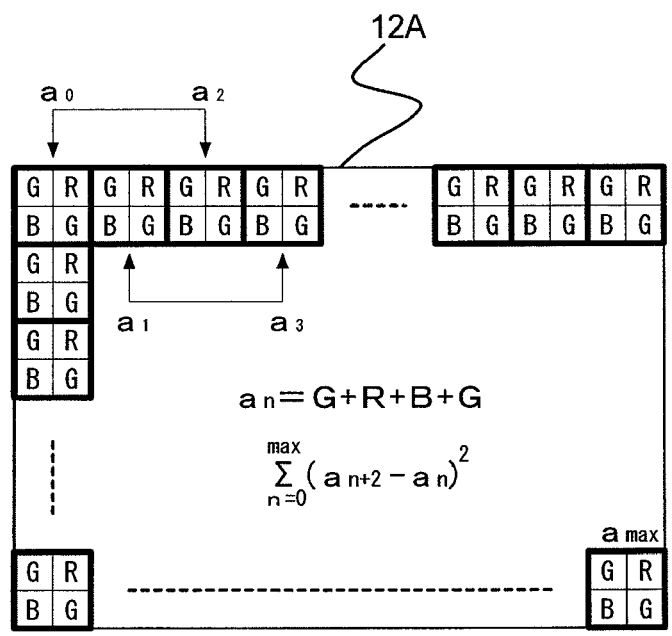
FIG. 3 is a diagrammatic illustration showing the arrangement of primary-color filters of the image pickup device.

FIG. 2 shows the relative position between the light receiving surface 12 of the image pickup device 11 and five focus detection areas: first through fifth focus detection areas 12A, 12B, 12C, 12D and 12E, arranged on the light receiving surface 12 in the shape of a cross, by way of example. FIG. 3 is an enlarged view of the first (central) focus detection area 12A. Each of the remaining four focus detection areas 12B through 12E has the same structure as the first focus detection area 12A, and accordingly, only the first focus detection area 12A is shown in FIG. 3. The first focus detection area 12A is positioned at substantially the center of the light receiving surface 12, the second and third focus detection areas 12B and 12C are positioned on laterally opposite sides of the first focus detection area 12A, and the fourth and fifth focus detection areas 12D and 12E are positioned on vertically opposite sides of the first focus detection area 12A. Primary-color filters (red (R), green (G) and blue (B) filters) are disposed in front of each pixel (photoelectric transducing element) on the object side thereof, and each pixel on the light receiving surface 12 transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal.

FIG. 3 shows a typical arrangement (Bayer array) of primary-color filters. In the contrast AF process in the illustrated embodiment of the digital camera, four pixels (a 2 by 2 matrix of pixels) in each square (i.e., a combination of two green filters, a red filter and a blue filter) is treated as one pixel block, and the sum of the magnitudes of image signals integrated by the four pixels in each pixel block is regarded as intensity $a_n$ ($a_n$=G+R+B+G).

Accordingly, an operation for determining the difference between the intensity $a_n$ of a pixel block and the intensity $a_n$ of another pixel block positioned one pixel-block away from the previous pixel block in the horizontal direction is repeated successively in the horizontally rightward direction within the first focus detection area 12A while the differences thus determined ($a_{n+2}$−$a_n$) are added up. Upon completion of these difference determining and adding operations on the pixel block at the right end of the first focus detection area 12A in the horizontal direction, the difference determining and adding operations are repeated on a subsequent row of pixel blocks one pixel block below the previous row of pixel blocks in the vertical direction until completion of the determining operation on the pixel block at the right end of the first focus detection area 12A in the horizontal direction and completion of the adding operation thereof. Such difference determining and adding operations are repeated on all the pixel blocks in the first focus detection area 12A. Subsequently, the same operations are performed on each of the remaining four focus detection areas 12B through 12E.

The sum of the differences ($a_{n+2}$−$a_n$) on each of the first through fifth focus detection areas 12A through 12E corresponds to the contrast value on the focus detection area at the current position of the focusing lens group L1. The contrast value can be represented by the following expression 1:

$$\sum_{n=0}^{max} (a_{n+2} - a_n)^2 \qquad \text{[Expression 1]}$$

In the present embodiment of the compact digital camera, the contrast AF process is performed upon the photometering switch SWS being turned ON. In the contrast AF process, the CPU 15 performs an image capturing process on the image pickup device 11 while moving the focusing lens group L1 stepwise via the motor driver 27, the AF motor 25 and the lens drive mechanism 23; inputs the image signals from the first through fifth focus detection areas 12A through 12E to determine the contrast values on the first through fifth focus detection areas 12A through 12E, respectively; and stores the determined contrast values in an internal RAM of the CPU 15 as contrast data. The CPU 15 repeats the contrast AF process while moving the focusing lens group L1 stepwise in steps of a predetermined amount of movement in the direction from the closest focus position (one end of the range of movement of the focusing lens group L1) toward the infinite focus position (the other end of the range of movement of the focusing lens group L1). This repetitive process is the above mentioned search process.

Immediately after contrast values at a predetermined number of lens positions in the direction from the closest focus position toward the infinite focus position are obtained, whether or not the contrast value obtained at the central position among the predetermined number of lens positions is a peak contrast value is determined. Specifically, contrast values at two adjacent lens positions of the focusing lens group L1 are compared with each other successively at consecutive lens positions in a direction of movement of the focusing lens group L1, e.g., in a direction from a position of the focusing lens group L1 on the closest focus position side to a position of the focusing lens group L1 on the infinite focus position side, to determine whether or not the contrast value increases successively a predetermined number of times and subsequently decreases successively a predetermined number of times to thereby determine whether or not the contrast value obtained at the central position is a peak contrast value. In the present embodiment of the digital camera, it is determined whether or not the contrast value increases two times consecutively, and subsequently decreases two times consecutively based on a group of obtained contrast values at consecutive five lens positions in the direction from the closest focus position toward the infinite focus position of the focusing lens group L1, i.e., whether or not the contrast value of the middle (third) lens position of the five lens positions is a peak contrast value. Thereafter, the same determining operation is repeated on another group of five contrast values at consecutive five lens positions which are shifted one by one toward the infinite focus position of the focusing lens group L1 with respect to the previous five lens positions.

In the illustrated embodiment of the digital camera, in the case where the release switch SWR is turned ON by a full-step depression of the release button in the middle of the performance of the contrast AF process that is performed upon the photometering switch SWS being turned ON (i.e., upon the release button being depressed by half a step), the contrast AF process is forcibly terminated before the focusing lens group L1 reaches the infinite focus position, and the focusing lens group L1 is moved to an in-focus position (if a peak contrast has been attained, a lens position at which the peak contrast was attained) or a specified focal length position (a lens position corresponding to a point within a depth of focus, at which an object image is rendered acceptably sharp) to perform an image capturing process thereat.

Operations of the present embodiment of the digital camera when the release switch SWR is turned ON before the focusing lens group L1 reaches the specified focal length position will be discussed with reference to FIGS. 4A, 4B, 5A and 5B that show graphs indicating the relationship between positions of the focusing lens group L1 and the respective contrast values thereat in the contrast AF process.

Figure 4:
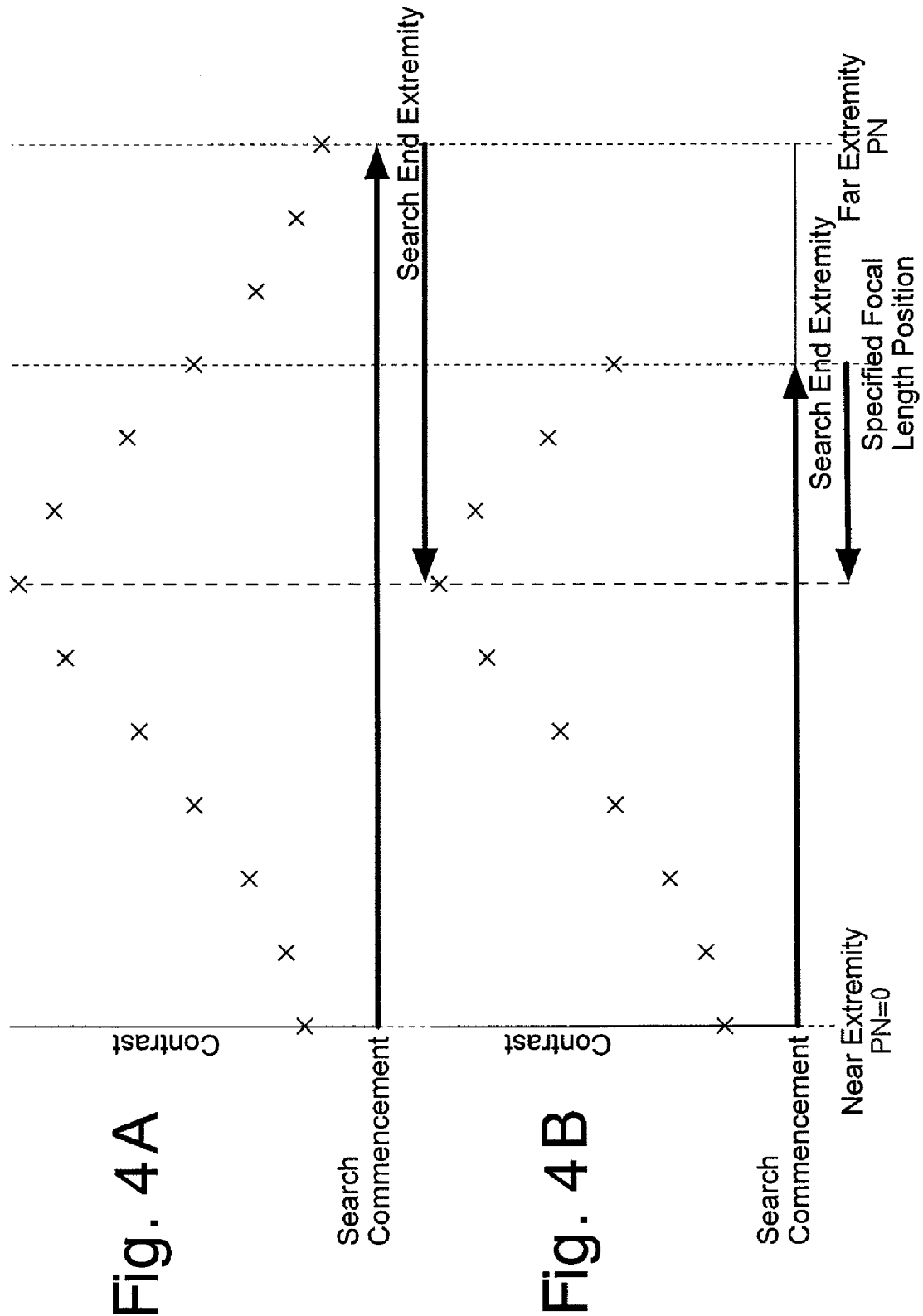
Figure 5:
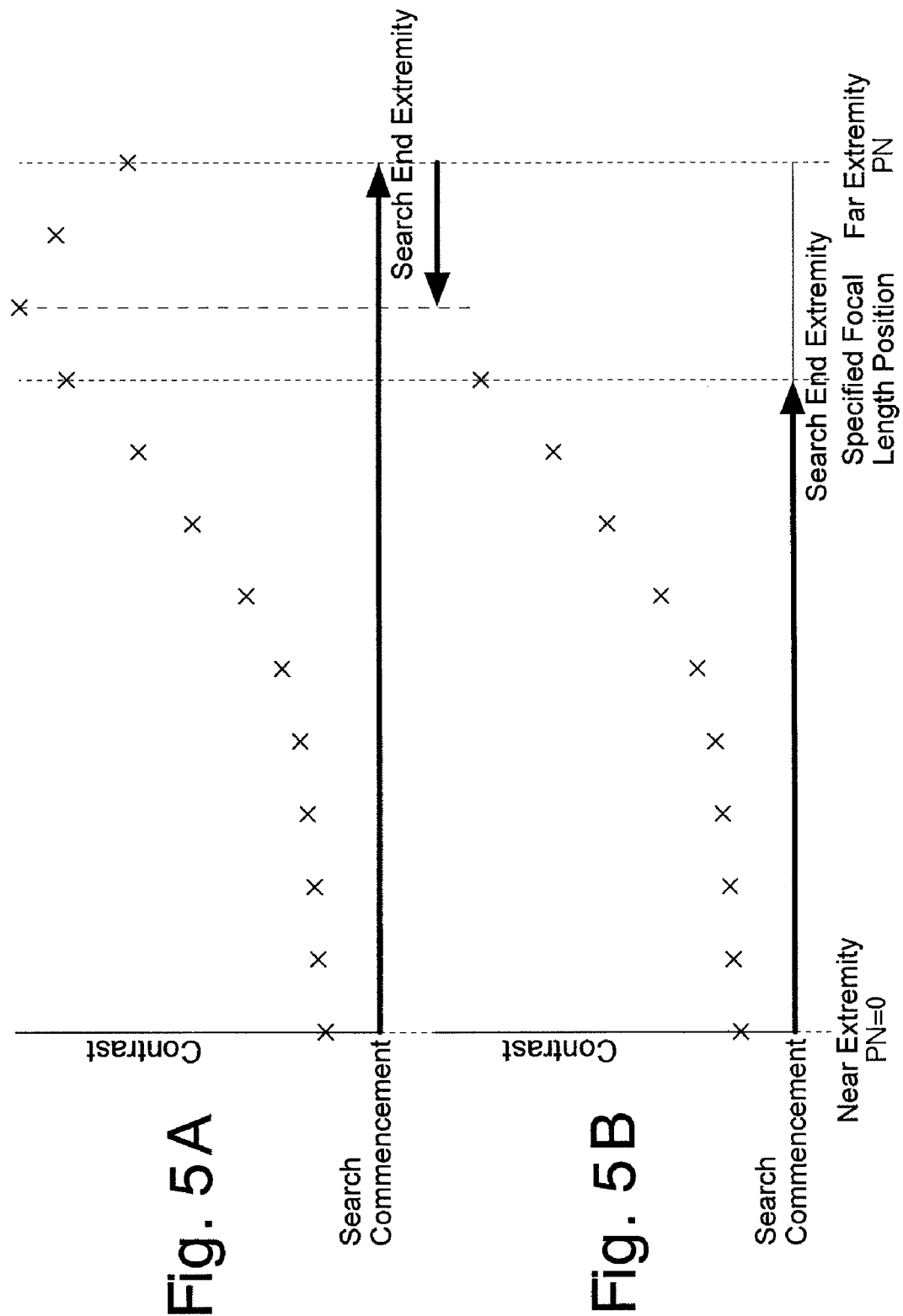

FIGS. 4A and 4B each show the relationship between positions of the focusing lens group L1 and the respective contrast values thereat in the contrast AF process in the case where an object to be photographed exists on the near side, and FIGS. 5A and 5B each show the relationship between positions of the focusing lens group L1 and the respective contrast values thereat in the contrast AF process in the case where an object to be photographed exists on the far side. FIGS. 4A and 5A show movements of the focusing lens group L1 when the search operation (in which the focusing lens group L1 is moved to the infinite focus position) is performed, and FIGS. 4B and 5B show movements of the focusing lens group L1 in the case where the photometering switch SWS is turned ON before the focusing lens group L1 reaches the specified focal length position.

In the illustrated embodiment of the digital camera, upon the release switch SWR being turned ON before the focusing lens group L1 reaches the specified focal length position, the search process continues to be performed until the focusing lens group L1 reaches the specified focal length position. Upon the focusing lens group L1 reaching the specified focal length position, the search process is terminated.

In the case (shown in FIG. 4B) where a peak contrast is detected before the termination of the search process, the focusing lens group L1 is moved from the specified focal length position to a position (in-focus position) at which a peak contrast has been detected. In the case (shown in FIG. 5B) where no peak contrast is detected before the termination of the search process, the focusing lens group L1 is held at the specified focal length position.

In this manner, according to the present embodiment of the digital camera, the time lag between the moment at which the release switch SWR is turned ON and the moment at which an object image is captured can be reduced because the search process is performed up unto the specified focal length position and an image capturing process starts thereat when the release switch SWR is turned ON before the focusing lens group L1 moves beyond the specified focal length position. Moreover, an object on the near side can be captured in a precisely focused state, and an object on the far side can be captured in a focused state.

Additionally, in the present embodiment of the digital camera, the search process is terminated immediately upon the release switch SWR being turned ON after the focusing lens group L1 moves beyond the specified focal length position. Thereafter, the focusing lens group L1 is moved to an in-focus position if this in-focus position (peak contrast) has been detected through the search process, or moved to the specified focal length position if no in-focus position (peak contrast) has not been detected through the search process.

In addition, according to the present embodiment of the digital camera, the time lag between the moment at which the release switch SWR is turned ON and the moment at which an object image is captured can be reduced because control immediately terminates the search process to enter the image capturing process upon the release switch SWR being turned ON after the focusing lens group L1 moves beyond the specified focal length position. Moreover, in the case where an in-focus position has been detected when, e.g., an object is positioned on the near side (a contrast peak, i.e., an in-focus position of an object positioned on the near side), the object image can be captured in a precisely focused state because the focusing lens group L1 is moved to the detected in-focus position. In the case where no in-focus position has been detected when, e.g., an object is positioned on the far side (low contrast in which a contrast peak is not yet attained so that in-focus state not detected of an object position on the far side), the object image can be captured in a focused state because the focusing lens group L1 is moved to the specified focal length position.

It is desirable that the aforementioned specified focal length position correspond to the hyperfocal distance (hyperfocal point) of the photographing lens L. In addition, it is desirable that the hyperfocal distance be set in consideration of an f-number which is automatically chosen and set at a time of exposure upon the photometering switch being turned ON.

Figure 6:
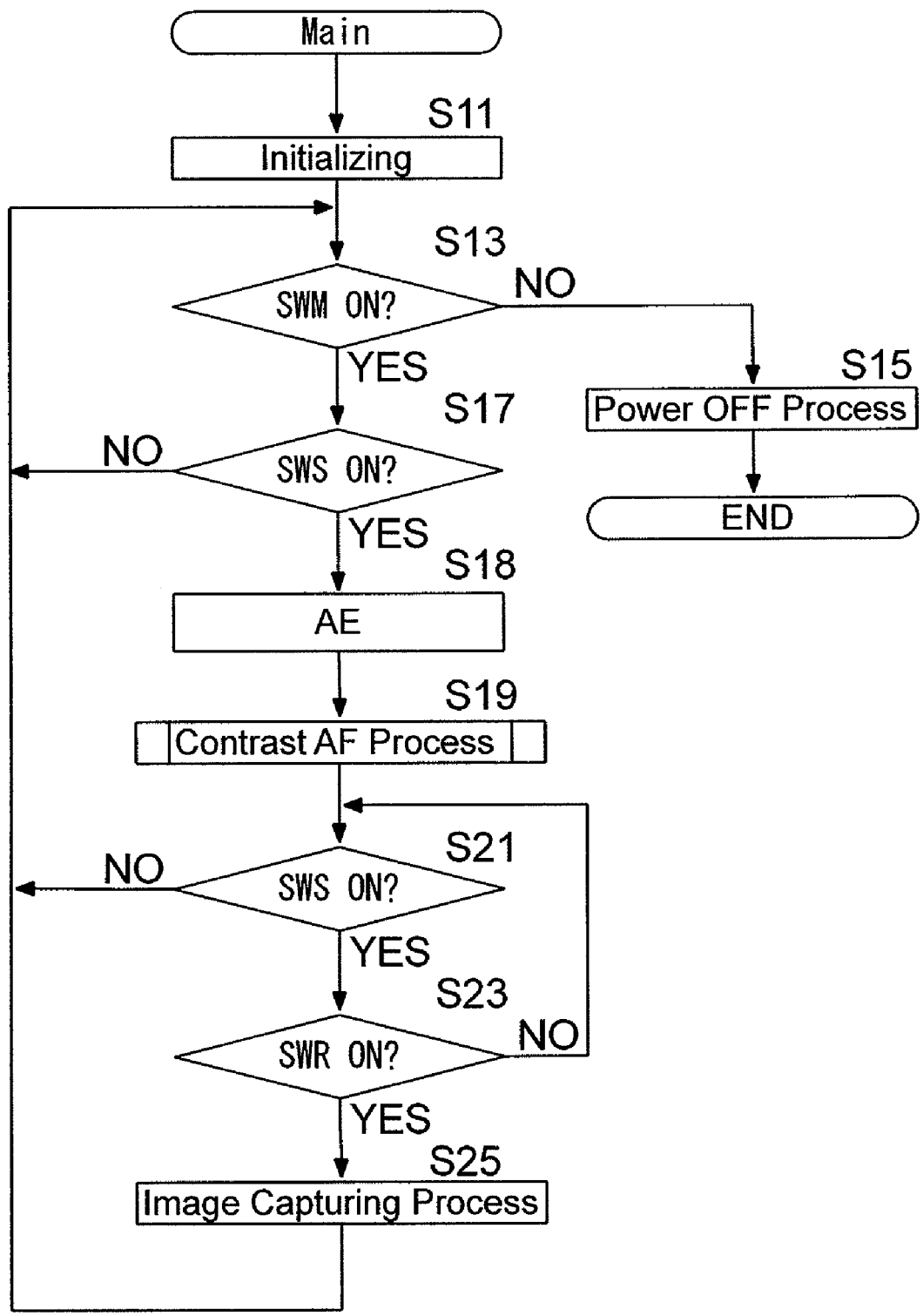
FIG. 6 is a flow chart showing a main process performed in the digital camera shown in FIG. 1.
Figure 7:
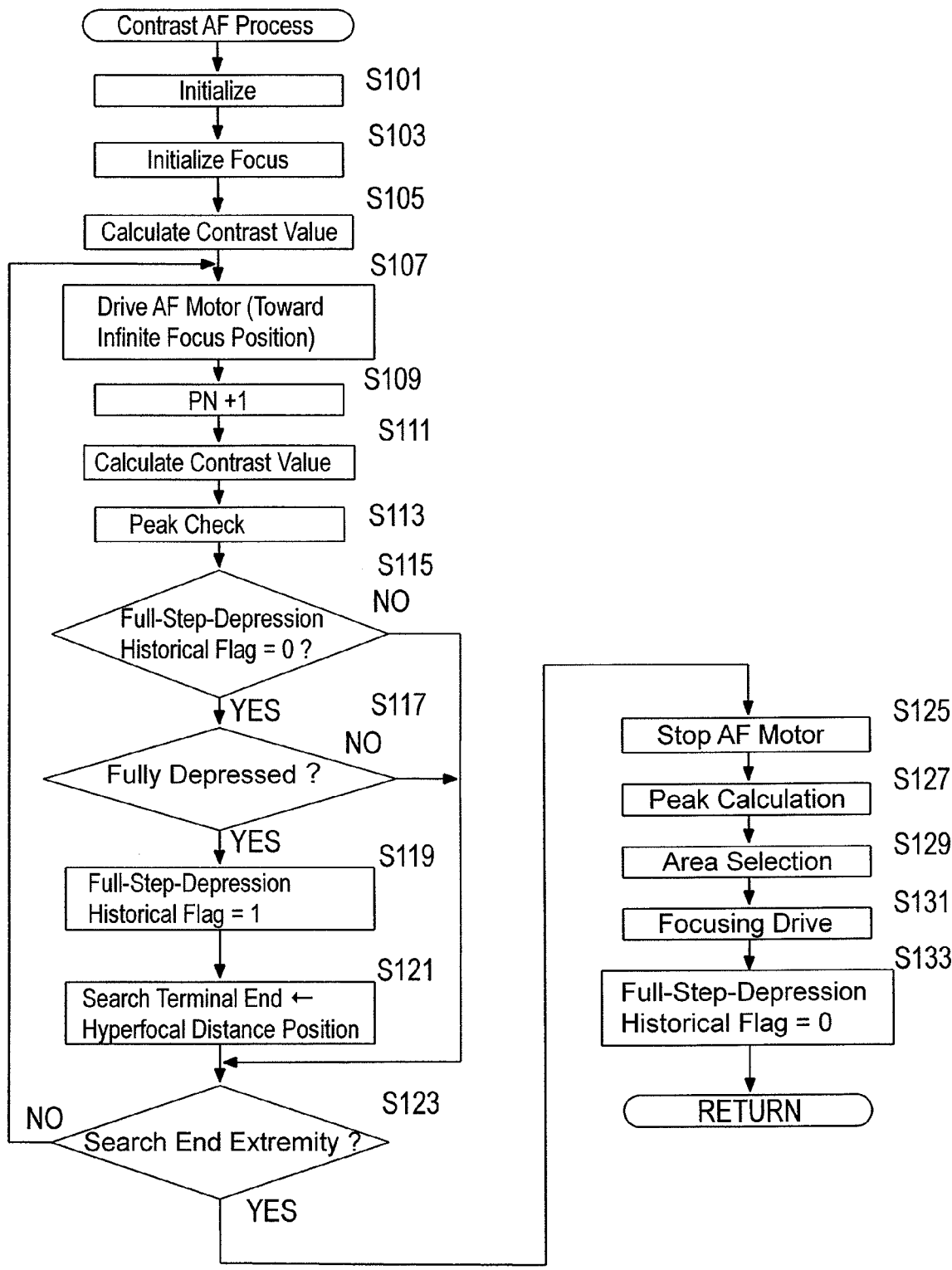
FIG. 7 is a flow chart showing a sub-routine "Contrast AF Process" performed in the main process shown in FIG. 6.

Operations of the present embodiment of the digital camera in the above described contrast AF mode will be hereinafter discussed with reference to the flow charts shown in FIGS. 6 and 7. FIG. 6 is a flow chart showing a main process performed in the present embodiment of the digital camera. Control enters this process upon a battery (not shown) being loaded into the camera. The contrast AF mode in this particular embodiment of the digital camera is a so-called one-shot AF mode or a single-drive AF mode, in which control waits for the release switch SWR to be turned ON upon the contrast AF process been performed once.

In the main process, firstly the CPU 15 performs an initializing process for initializing an internal RAM and various ports of the CPU 15 (step S11). Subsequently, it is determined whether or not the main switch SWM is ON (step S13). If the main switch is not ON (if NO at step S13), power is turned OFF and control ends. Thereafter, the CPU 15 is periodically activated to check the ON/OFF state of the main switch SWM (step S13).

If the main switch is ON (if YES at step S13), it is determined whether or not the photometering switch SWS is ON (step S17). If the photometering switch SWS is not ON (if NO at step S17), control returns to step S13. If the photometering switch SWS is ON (if YES at step S17), an AE (Auto Exposure) is calculated based on the image data input from the image pickup device 11 so that the aperture value and the shutter speed is calculated, and furthermore, the hyperfocal distance is set based on this calculated aperture value and the focal length of the photographing optical system L1 (step S18). In the case where the photographing optical system L1 is a zoom lens, the hyperfocal distance is set using the current focal length. Thereafter, the contrast AF process (see FIG. 7) is performed (step S19).

Thereafter, it is determined whether or not the photometering switch SWS is ON (step S21). If the photometering switch SWS is not ON (if NO at step S21), control returns to step S13. If the photometering switch SWS is ON (if YES at step S21), it is determined whether or not the release switch SWR is ON (step S23). If the release switch SWR is not ON (if NO at step S23), control returns to step S21 to repeat the operation at step S23 as long as the photometering switch SWS is ON (if YES at step S21).

Upon the release switch SWR being turned ON (if YES at step S23), an image capturing process is performed (step S25) and control returns to step S13.

The contrast AF process that is performed at step S19 will be hereinafter discussed with reference to the flow chart shown in FIG. 7 and the graphs shown in FIGS. 4A, 4B, 5A and 5B, that indicate the relationship between positions of the focusing lens group L1 and the respective contrast values thereat.

In the contrast AF process, firstly various variables, etc., are initialized (step S101). For instance, each status (flag) is cleared (i.e., set to 0), contrast values are cleared, a lens-position pulse number PN is initialized (PN=0), a peak counter is initialized (the peak contrast value is set to 0), the maximum contrast value is set to 0, the minimum contrast value is set to FFFFFFFF, a full-step-depression historical flag is initialized (set to 0), and the infinite focus position is set as a search end extremity.

Principal variables and the like are defined as follows.

Contrast values are those actually obtained at each focus detection area. The lens-position pulse number PN is a variable which is incremented by one every time the encoder 26 outputs one pulse (drive pulse) when the AF motor 25 is driven in the direction toward the far extremity (infinite focus position), wherein the lens-position pulse number PN is 0 when the focusing lens group L1 is positioned at the near extremity (closest focus position). The count of the aforementioned peak counter represents the number of detected peak contrast values. The maximum contrast value and the minimum contrast value are variables to which actually-obtained maximum and minimum contrast values are assigned, respectively. The full-step-depression historical flag is a flag which identifies whether or not the release button has been fully depressed, and is initially set to 0 (which indicates that the release button has not been fully depressed).

Subsequently, a focus initializing process is performed (step S103). In this focus initializing process, the focusing lens group L1 is moved to the near extremity determined according to an exposure mode (micro mode or normal exposure mode), a focal length, etc.

After the completion of the focus initialing process at step S103, a contrast value calculating process at the near extremity (the current position of the focusing lens group L1) (the lens-position pulse number PN=0) is performed (S105). Namely, based on the image data input from the image pickup device 11, a contrast value P[0] at the near extremity of the focusing lens group L1 is calculated, and each of the maximum contrast value Max and the minimum contrast value Min of the contrast value is updated.

[IF RELEASE BUTTON DEPRESSED BY HALF A STEP (WHERE RELEASE SWITCH SWR IS OFF)]

The AF motor 25 is driven by one step in a direction to move the focusing lens group L1 toward the far extremity by one step (step S107) and the lens-position pulse number PN is increased by one (step S109). Subsequently, a contrast value calculating process (in which the contrast value P[PN] is calculated in accordance with image data input from the image pickup device 11 and each of the maximum contrast value and the minimum contrast value is updated) is performed (step S111).

Subsequently, a peak check process is performed which determines whether or not the contrast value P[PN] calculated at step S111 is a peak contrast value which satisfies predetermined conditions (step S113). In the present embodiment of the digital camera, it is determined whether or not the central contrast value among the five contrast values obtained at most-recent consecutive five lens positions is a peak contrast value. The contrast value calculating process at step S111 and the peak check process at step S113 are performed on all the five focus detection areas 12A, 12B, 12C, 12D and 12E. It should be noted that the first through fifth focus detection areas 12A, 12B, 12C, 12D and 12E will be abbreviated as areas 0, 1, 2, 3 and 4, respectively, in the following description.

Subsequently, it is determined whether or not the full-step-depression historical flag is 0 (step S115). Namely, it is determined whether or not control enters the operation at step S115 before the release button is fully depressed. If the full-step-depression historical flag is 0 (if YES at step S115), it is determined whether or not the release switch has been fully depressed (step S117). If the release switch has not been fully depressed (if NO at step S117), it is determined whether or not the focusing lens group L1 has reached the search end extremity thereof (step S123). In the illustrated embodiment, this search end extremity corresponds to the infinite focus position or the hyperfocal distance position, and has been set as the lens-position pulse number PN. If the focusing lens group L1 has not reached the search end extremity thereof (if NO at step S123), control returns to step S107 so that the above described operations at steps S107 through S121 are repeated until it is determined at step S123 that the focusing lens group L1 has reached the search end extremity thereof.

[IF RELEASE BUTTON FULLY DEPRESSED (WITH RELEASE SWITCH SWR ON)]

If the release switch has been fully depressed (if YES at step S117), the full-step-depression historical flag is set to 1 (step S119) and the hyperfocal distance position is assigned to the search end extremity (step S121). Subsequently, it is determined whether or not the focusing lens group L1 has reached the hyperfocal distance position (step S123). If the focusing lens group L1 has not reached the hyperfocal distance position (if NO at step S123), control returns to step S107 so that the operations at steps S107 through S121 are repeated until it is determined at step S123 that the focusing lens group L1 has reached the hyperfocal distance position. This state corresponds to the case shown in FIG. 4B or FIG. 5B. It is desirable that the hyperfocal distance position be variable and determined in accordance with the f-number set by a photometering operation.

If the focusing lens group L1 has reached the search end extremity thereof (if YES at step S123) or if the focusing lens group L1 has reached the hyperfocal distance position after the operations at steps S107 through S121 are repeated (if YES at step S123), the AF motor 25 is stopped (step S125). Subsequently, a peak calculation process for calculating a more precise peak contrast value by linear approximation is performed in accordance with the five contrast values (which includes a peak contrast value) at consecutive five lens positions which are obtained in the loop process at steps S107 through S123 (step S127). Namely, an estimated more precise peak contrast value is calculated by linear approximation because there is a possibility of a real peak contrast value existing in the vicinity of the peak contrast value among the contrast values respectively calculated at stepwise positions.

Subsequently, an area selection process is performed wherein one of the areas 0 through 4 in which a peak contrast value corresponding to the closest distance has been obtained is selected as a focus detection area and the peak contrast value thereof is selected (step S129). Subsequently, a focusing drive process is performed wherein the focusing lens group L1 is moved to a lens position where the peak contrast value is obtained (step S131), the full-step-depression historical flag is cleared (set to 0), and control returns.

If no effective peak contrast value can be selected in the area selection process at step S129, the focusing lens group L1 is moved to the hyperfocal distance position in the area selection process at step S131.

As described above, in the above illustrated embodiment of the digital camera, when the release button is fully depressed (when the release switch SWR is turned ON) during the contrast AF process before the focusing lens group L1 moves beyond the hyperfocal distance position, the search process is terminated upon the focusing lens group L1 reaching the hyperfocal distance position to set an in-focus position from among the peak contrast values obtained from the contrast data obtained by then, or the hyperfocal distance position is set as an in-focus position if no peak contrast value is obtained. Therefore, the time lag between the moment at which the release button is fully depressed and the moment at which the image capturing operation is performed is reduced.

When the release button is fully depressed (when the release switch SWR is turned ON) after the focusing lens group L1 reaches the hyperfocal distance position, the contrast AF is immediately terminated to set an in-focus position from among the peak contrast values obtained, or the hyperfocal distance position is set as an in-focus position if no peak contrast value is obtained. Therefore, the time lag between the moment at which the release button is fully depressed and the moment at which the image capturing operation is performed is reduced.

Moreover, in the case where an object exists on the near side, this object can be brought into focus because the search process continues to be performed until the focusing lens group L1 reaches the hyperfocal distance position on the near side, where depth of field is shallow. In the case where no object exists on the near side, the focusing lens group L1 is moved to the hyperfocal distance position, and accordingly, even if an object exists on the far side, this object can be brought into focus.

If the focusing lens group L1 moves beyond the hyperfocal distance position during the search process and if a peak contrast is obtained, the object image from which this peak contrast is obtained can be brought into focus with precision. Even if no peak contrast is obtained, an object image on the far side can be brought into focus since the focusing lens group L1 is moved to the hyperfocal distance position.

Although the present invention has been discussed with reference to the above illustrated embodiment of the compact digital camera which incorporates a contrast detection AF system, the present invention can be generally applied to any focus adjusting system which detects a focus state while moving a focusing lens group from the closest focus position to the infinite focus position.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera having an exposure device for photographing an object image formed via a photographing optical system, said camera comprising:
   a focus adjusting system which performs a search operation for detecting an in-focus position while moving a focusing lens group;
   a first switch which causes activation of said focus adjusting system;
   a second switch which causes activation of said exposure device; and
   a controller which controls operations of said exposure device,
   wherein, upon said second switch being operated before completion of said search operation after said focus adjusting system starts to operate, said controller terminates said search operation and activates said exposure device after said focus adjusting system performs said search operation up to a specified focal length position in the case where said second switch is operated before said focusing lens group reaches said specified focal length position,
   wherein, upon said second switch being operated before completion of said search operation after said focus adjusting system starts to operate, said controller immediately terminates said search operation and activates said exposure device in the case where said second switch is operated after said focusing lens group reaches said specified focal length position,
   wherein, in the case where said in-focus position is detected by said search operation after completion of said search operation, said focusing lens group is moved to said in-focus position and thereupon said controller activates said exposure device, and
   wherein, in the case where no in-focus position is detected by said search operation after completion of said search operation, said focusing lens group is moved to said specified focal length position and thereupon said controller activates said exposure device.

2. The camera according to claim 1, wherein said exposure device comprises an imaging device which converts said object image into electrical image data and outputs said electrical image data, and
   wherein said focus adjusting system inputs said image data and detects said in-focus position based on said image data while moving said focusing lens group from a closest focus position toward an infinite focus position.

3. The camera according to claim 2, wherein said focus adjusting system comprises a contrast detection focus adjusting system which detects said in-focus position by detecting contrast values from said image data.

4. The camera according to claim 1, wherein said specified focal length position corresponds to a hyperfocal distance of said photographing optical system.

5. The camera according to claim 4, wherein said hyperfocal distance is set based on a brightness value of said object image and a focal length of said photographing optical system.

6. The camera according to claim 1, wherein said first switch and said second switch are associated with a release button provided on a camera body of said camera, and wherein said first switch and said second switch are turned ON upon said release button being half and fully depressed, respectively.

7. The camera according to claim 1, wherein said focus adjusting system comprises a stepping motor which moves said focusing lens group stepwise from a closest focus position toward an infinite focus position.

8. The camera according to claim 7, further comprising an imaging device which captures an object image via said photographing optical system and converts said captured object image into an electrical image signal, wherein, while moving said focusing lens group stepwise by said stepping motor, said autofocus system captures an object image each time said focusing lens group is moved by one step, and detects a peak contrast among a plurality of contrasts of said electrical image signals of said captured object images to determine said in-focus position.

9. A camera having an exposure device for photographing an object image formed via a photographing optical system, said camera comprising:

a focus adjusting system which performs a search operation for detecting an in-focus position while moving a focusing lens group;

a first switch which causes activation of said focus adjusting system;

a second switch which causes activation of said exposure device; and a controller which controls operations of said exposure device, wherein, upon said second switch being operated before completion of said search operation after said focus adjusting system starts to operate, said controller terminates said search operation and activates said exposure device after said focus adjusting system performs said search operation up to a specified focal length position in the case where said second switch is operated before said focusing lens group reaches said specified focal length position, wherein, upon said second switch being operated before completion of said search operation after said focus adjusting system starts to operate, said controller immediately terminates said search operation and activates said exposure device in the case where said second switch is operated after said focusing lens group reaches said specified focal length position.

* * * * *